F. M. KENNEDY.
PROCESS OF PREVENTING MOLDING IN SHAPED TIMBER.
APPLICATION FILED AUG. 27, 1912.
1,059,879.
Patented Apr. 22, 1913.
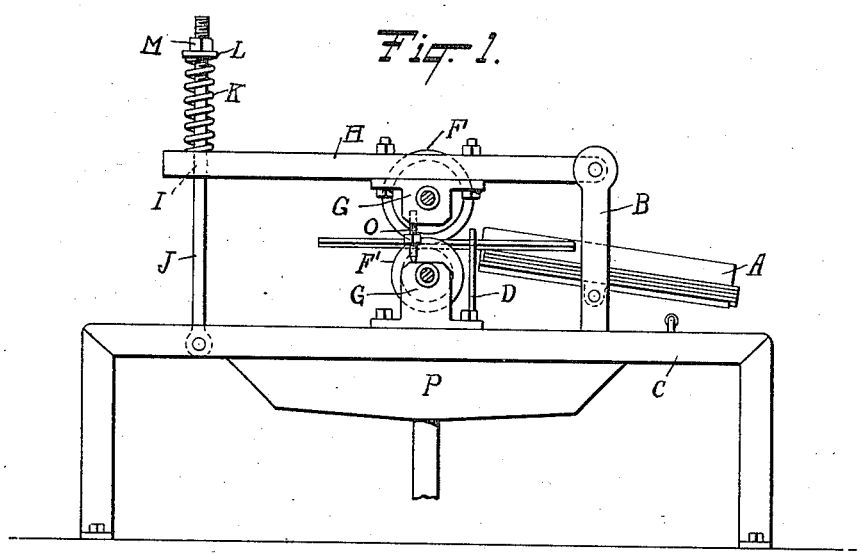
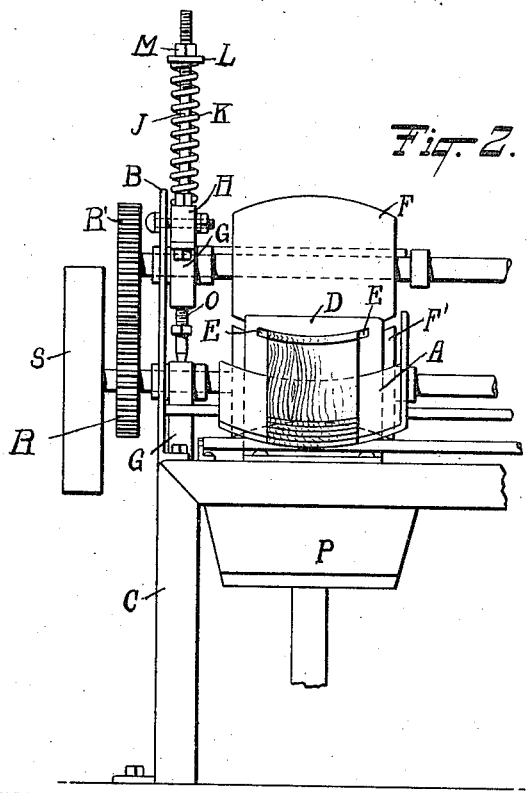
WITNESSES
George Bamlay
B. Joffe
INVENTOR
Frank Marion Kennedy
BY
ATTORNEYS

UNITED STATES PATENT OFFICE.

FRANK MARION KENNEDY, OF CLARENDON, ARKANSAS.

PROCESS OF PREVENTING MOLDING IN SHAPED TIMBER.

1,059,879.   Specification of Letters Patent.   Patented Apr. 22, 1913.

Application filed August 27, 1912. Serial No. 717,278.

*To all whom it may concern:*

Be it known that I, FRANK MARION KENNEDY, a citizen of the United States, and a resident of Clarendon, in the county of Monroe and State of Arkansas, have invented a new and Improved Process of Preventing Molding in Shaped Timber, of which the following is a full, clear, and exact description.

This invention relates to a process of preventing molding in shaped timber, and more particularly to a process consisting in expelling from the timber the sap subject to atmospheric action.

An object of the invention is to extract hot sap from steamed timber by passing a piece of steaming hot timber between two revolving rollers.

Another object of the invention is to extract hot sap from wood by passing it between two revolving rollers, thus preventing said passed wood from becoming moldy while the same is being dried.

A still further object of the invention is to extract hot sap from steamed timber by passing same between two shaped revolving rollers, and enabling the passed timber to retain the form received from the rollers.

The purpose of this process will clearly appear from the following: Cut slack barrel staves are manufactured principally from the following timber—elm, cottonwood and gum, this being the timber mostly used in the South, gum forming the largest part. This timber is steamed and cut with a knife while hot, and the staves so formed are then stacked in loose piles to dry. Owing to the sap contained in the timber, together with the humidity of the air, the staves will always be more or less covered with mold, by reason of the sap souring or fermenting. The souring of sap and consequent molding of staves is very bad in the case of gum timber, as cut staves made of such timber and moldy are very low priced on the market. To protect the timber from molding I employ a process, as will be hereinafter described, which not only prevents molding of the cut slack barrel staves, but at the same time gives them the proper form, and also a valuable by-product is added to it.

Reference is to be had to the accompanying drawing forming a part of this specification, and showing an apparatus for carrying out my process, in which similar characters of reference indicate corresponding parts in both views.

Figure 1 is an elevation of a machine by means of which my process is carried out; and Fig. 2 is a side elevation of the same.

Before proceeding to a more detailed description of my invention, it must be understood that while the drawings disclose convex or concave rollers, any shaped rollers may be employed, and while my process is principally applied to cut slack barrel staves, it may be applied to any other timber that will have to receive a shape and prevent molding while it is drying.

Referring more particularly to the drawing, I provide a rocking table A, centrally pivoted on a standard B on an axis normal to the length of the staves placed upon the table A. The standard B is mounted on the frame C of the device. In front of the rocking table A a standard or wall D is attached to the frame C and a slot E, provided in the standard D, allows only one stave to be fitted at a time from the rocking table to the pressure form rollers F, F', the pressure form roller being mounted in bearings G, the lower bearing being supported on the frame C and fixed to the same; the upper bearing is mounted on a lever H pivoted at one end on the extremity of the standard B and at the other provided with an orifice I. Through the orifice I a rod J projects. The rod J at its lower end is pivotally attached to the frame C and at its upper end is threaded, and receives a coil spring K bearing with its lower end on the lever H and at its opposite end against a washer L, the washer being maintained in bearings with the spring by a nut M screwed on the rod J. By means of the nut M on the rod J, the tension of the spring K may be varied. A stud O is provided between the bearings G and threaded into the upper bearing so as to adjust the amount of space between the rollers. The frame C is also provided with a drip pan P into which the sap is run from the passing timber.

The lower roller F' has its driving shaft projecting through the bearing, carrying a spur gear R and driving pulley S rigidly attached to the shaft. The upper roller F has its driving shaft also projecting through its bearing and provided with a spur gear R' rigidly fixed on its shaft, meshing with the gear R and being driven by said gear, the roller F being convexed and the roller F' concaved, having their radiuses of curvature slightly larger than the diameter of the barrel for which the stave is cut.

Slack barrel stave bolts (timber from which the staves are cut) are either steamed or boiled in hot water to soften them, and then cut while hot by the slack barrel stave cutting machine, using a concave knife having the shape of the bilge of a barrel. A number of superposed cut staves, still hot, are placed on the rocking table A of my device, and one by one passed through the slot E in the standard D, and by said slot directed between the two shaping rollers, the rollers F, F' being of small diameter so as to have a small surface of contact with the timber passing between them. The timber is carried by the friction of the rotating rollers and the wood, the amount of pressure on the passing wood being regulated by the tension of the spring K. I have found that this pressure must be so adjusted that the pressure rollers will force the sap to the surface of the hot stave in advance of the rollers, due to their motion and pressure, and not to force the sap through the longitudinal pores of the timber, the sap being forced to either side over the last end of the stave passing between the rollers, and dripping into the receiving pan P. Thus the sap is being removed from both surfaces of the stave while it is hot, and in consequence leaves the surfaces dry, and the center portion containing about the same amount of sap as before rolling. That is to say, the pressure action of the spring K is so adjusted as to remove only the surface sap. The sap remaining in the center of the stave leaves to the timber sufficient elasticity to take the shape of the rollers and maintain the same shape, while the amount of sap remaining on the surface is so small that no souring or fermentation will take place when in contact with the air and when being stacked in piles, and therefore no molded staves will be formed in the stacks.

The reason for making the radius of the convexity and concavity of the rollers larger than the radius of the barrel is to compensate for the straightening out when drying.

It is easily seen that with my process, not only better hot slack barrel staves are produced, but a new valuable by-product also results, and it requires less time for drying the staves, as part of the sap is already removed from the timber. It must also be remarked that by removing the surface sap a large per cent. of the coloring matter is also removed, therefore bleaching the timber to a more uniform color.

Having thus described my invention, what I claim as new and desire to secure by Letters Patent is:—

1. The process of removing the surface sap from timber, which consists of submitting the timber to the action of steam, and then expelling from the timber that part of the sap which is near the surface only, whereby the interior part of the timber retains the sap.

2. The process of removing the surface sap from timber, which consists of submitting the timber to the action of steam, and then subjecting the timber to a pressure such that the surface sap is removed therefrom.

3. The process of removing the surface sap from timber, which consists of submitting the timber to the action of steam and then subjecting the timber to a variable pressure such that the surface sap is removed therefrom.

4. The process of removing the surface sap from timber, which consists of submitting the timber to the action of steam and then subjecting the timber to a rolling pressure such as to remove the sap from the surface of the timber only and leaving in the body of the timber sufficient sap to allow the wood to assume desired shapes.

In testimony whereof, I have signed my name to this specification in the presence of two subscribing witnesses.

FRANK MARION KENNEDY.

Witnesses:
J. W. KERR,
L. JAMES.

Copies of this patent may be obtained for five cents each, by addressing the "Commissioner of Patents, Washington, D. C."